(12) United States Patent
Mueller et al.

(10) Patent No.: US 10,116,036 B2
(45) Date of Patent: Oct. 30, 2018

(54) WIRED PIPE COUPLER CONNECTOR

(71) Applicants: Stephan Mueller, Hannover (DE); Robert Buda, Lower Saxony (DE); Ingo Roders, Seelze (DE); Henning Rahn, Niedersachsen (DE)

(72) Inventors: Stephan Mueller, Hannover (DE); Robert Buda, Lower Saxony (DE); Ingo Roders, Seelze (DE); Henning Rahn, Niedersachsen (DE)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 183 days.

(21) Appl. No.: 14/460,425

(22) Filed: Aug. 15, 2014

(65) Prior Publication Data

US 2016/0049718 A1    Feb. 18, 2016

(51) Int. Cl.

| | |
|---|---|
| *H01Q 1/22* | (2006.01) |
| *B22D 17/22* | (2006.01) |
| *B29C 70/88* | (2006.01) |
| *E21B 17/00* | (2006.01) |
| *H01Q 1/04* | (2006.01) |
| *B22D 19/04* | (2006.01) |
| *B29L 31/34* | (2006.01) |
| *B29L 31/24* | (2006.01) |

(Continued)

(52) U.S. Cl.
CPC ........... *H01Q 1/22* (2013.01); *B22D 17/2209* (2013.01); *B22D 19/04* (2013.01); *B29C 70/885* (2013.01); *E21B 17/003* (2013.01); *H01Q 1/04* (2013.01); *B29K 2071/00* (2013.01); *B29K 2505/00* (2013.01); *B29L 2031/24* (2013.01); *B29L 2031/3456* (2013.01); *B29L 2031/3493* (2013.01)

(58) Field of Classification Search
CPC .......... H01Q 1/20; H01Q 1/22; E21B 17/003
USPC ................................. 343/720; 439/191, 194
See application file for complete search history.

(56) References Cited

U.S. PATENT DOCUMENTS

| | | | | |
|---|---|---|---|---|
| 5,202,680 A | * | 4/1993 | Savage | ................. E21B 17/006 175/40 |
| 6,252,518 B1 | * | 6/2001 | Laborde | .................. E21B 47/12 340/855.3 |

(Continued)

FOREIGN PATENT DOCUMENTS

EP    1782936 B2    5/2007

OTHER PUBLICATIONS

Notification of Transmittal of the International Search Report and the Written Opinion of the International Searching Authority, or the Declaration; PCT/US2015/044948; dated Oct. 22, 2015, 10 pages.

*Primary Examiner* — Huedung Mancuso
(74) *Attorney, Agent, or Firm* — Cantor Colburn LLP

(57) ABSTRACT

A wired pipe segment includes a body extending from a box end to a pin end and a coupler located in one of the box and pin ends. The coupler includes a carrier having at least one electrical component disposed therein and one or more antennas supported by and spaced from the carrier and being electrically coupled to the carrier through at least one of the electrical components, the antennas being formed in the carrier in a same molding machine. The segment also includes a transmission line extending away from the coupler towards the other of the box and pin end and in communication with the one or more antennas.

7 Claims, 5 Drawing Sheets

(51) Int. Cl.
   *B29K 71/00*     (2006.01)
   *B29K 505/00*    (2006.01)

(56) References Cited

U.S. PATENT DOCUMENTS

| | | | |
|---|---|---|---|
| 6,641,434 B2 | 11/2003 | Boyle et al. | |
| 8,049,506 B2 * | 11/2011 | Lazarev | E21B 17/028 175/40 |
| 8,242,928 B2 | 8/2012 | Prammer | |
| 8,826,972 B2 * | 9/2014 | Flint | E21B 17/006 166/250.11 |
| 9,303,464 B2 * | 4/2016 | Peters | E21B 17/028 |
| 2002/0109263 A1 * | 8/2002 | Goldbach | B29C 45/14467 264/271.1 |
| 2005/0285706 A1 * | 12/2005 | Hall | E21B 17/028 336/132 |
| 2005/0285754 A1 * | 12/2005 | Hall | E21B 17/028 340/855.1 |
| 2006/0124291 A1 | 6/2006 | Chau | |
| 2008/0251247 A1 * | 10/2008 | Flint | E21B 17/006 166/65.1 |
| 2009/0145571 A1 * | 6/2009 | Onda | B22D 23/02 164/121 |
| 2011/0315399 A1 | 12/2011 | Rodney et al. | |
| 2012/0176138 A1 * | 7/2012 | Prammer | E21B 17/028 324/338 |
| 2014/0144614 A1 * | 5/2014 | Buda | E21B 17/028 166/65.1 |
| 2014/0290930 A1 * | 10/2014 | Peters | E21B 17/028 166/65.1 |
| 2016/0375701 A1 * | 12/2016 | Osterday | B41J 3/4075 156/245 |
| 2017/0373377 A1 * | 12/2017 | Gagne-Keats | H01Q 1/243 |

\* cited by examiner

WIRED PIPE COUPLER CONNECTOR

BACKGROUND

During subterranean drilling and completion operations, a pipe or other conduit is lowered into a borehole in an earth formation during or after drilling operations. Such pipes are generally configured as multiple pipe segments to form a "string", such as a drill string or production string. As the string is lowered into the borehole, additional pipe segments are coupled to the string by various connecting mechanisms, such as threaded connections.

Various power and/or communication signals may be transmitted through the pipe segments via a "wired pipe" configuration. Such configurations include electrical, optical or other conductors extending along the length of selected pipe segments. The conductors are operably connected between pipe segments by a variety of connecting configurations.

One such connecting configuration includes a threaded male-female configuration often referred to as a pin-box connection. The pin-box connection includes a male member, i.e., a "pin end" that includes an exterior threaded portion, and a female member, i.e., a "box end", that includes an interior threaded portion and is configured to receive the pin in a threaded connection.

Some wired pipe configurations include a coupler mounted on the tip of the pin as well as in the box end. The coupler transmits power, data or both to an adjacent coupler. The coupler in the pin end is typically connected via a coaxial cable to a coupler in the box end.

SUMMARY

Disclosed herein is a wired pipe segment includes a body extending from a box end to a pin end and a coupler located in one of the box and pin ends. The coupler includes a carrier having at least one electrical component disposed therein and one or more antennas supported by and spaced from the carrier and being electrically coupled to the carrier through at least one of the electrical components, the antennas being formed in the carrier in a same molding machine. The segment also includes a transmission line extending away from the coupler towards the other of the box and pin end and in communication with the one or more antennas.

Also disclosed is a wired pipe coupler that carries at least a data signal that includes a carrier having a plurality of electrical components disposed therein and one or more antennas supported by and spaced from the carrier, the one or more antennas being electrically coupled to the carrier through respective ones of the plurality of electrical components, the antennas being formed in the carrier in a same molding machine.

Also disclosed is a method of forming a wired pipe coupler including: molding with plastic a carrier ring that includes one or more recesses; injecting metal into the one or more recesses, the melting point the metal not exceeding the melting point of the plastic; connecting an electrical connector to the metal; and covering the plastic, the metal and at least a portion of the electrical connector with a plastic covering. The molding, injecting, and covering are all done in a single mold.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed system, apparatus and method are presented herein by way of exemplification and not limitation with reference to the Figures.

Figure 1:
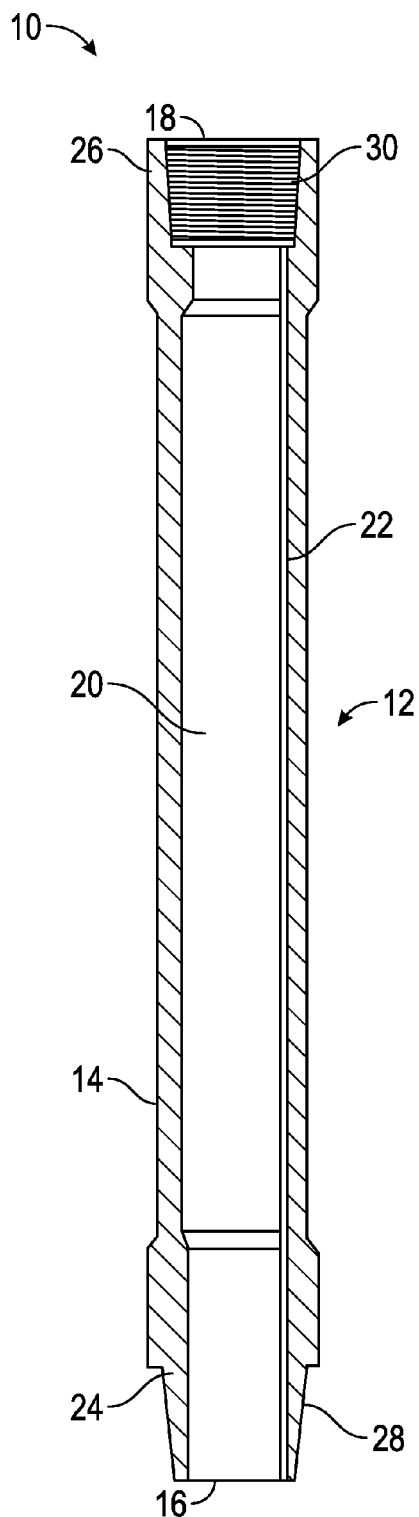
FIG. 1 depicts an exemplary embodiment of a wired pipe segment of a well drilling and/or logging system.

Referring to FIG. 1, an exemplary embodiment of a portion of a well drilling, logging and/or production system 10 includes a conduit or string 12, such as a drillstring or production string, that is configured to be disposed in a borehole for performing operations such as drilling the borehole, making measurements of properties of the borehole and/or the surrounding formation downhole, and facilitating hydrocarbon production.

For example, during drilling operations, drilling fluid or drilling "mud" is introduced into the string 12 from a source such as a mud tank or "pit" and is circulated under pressure through the string 12, for example via one or more mud pumps. The drilling fluid passes into the string 12 and is discharged at the bottom of the borehole through an opening in a drill bit located at the downhole end of the string 12. The drilling fluid circulates uphole between the string 12 and the borehole and is discharged into the mud tank or other location.

The string 12 includes at least one string or wired pipe segment 14 having an uphole end 16 and a downhole end 18. As described herein, "uphole" refers to a location near the surface relative to a reference location when the segment 14 is disposed in a borehole, and "downhole" refers to a location away from the surface relative to the reference location.

An inner bore or other conduit 20 extends along the length of each segment 14 to allow drilling mud or other fluids to flow therethrough. A transmission line 22 is located within the segment 14 to provide protection for electrical, optical or other conductors to be disposed along the segment 14. In one embodiment, the transmission line 22 is a coaxial cable. In another embodiment, the transmission line 22 is formed of any manner of carrying power or data, including, for example, a twisted pair. In the case where the transmission line 22 is a coaxial cable it may include an inner conductor surrounded by a dielectric material. The coaxial cable may also include a shield layer that surrounds the dielectric. In one embodiment, the shield layer is electrically coupled to an outer conductor that may be formed, for example, by a rigid or semi-rigid tube of a conductive material.

The segment 14 includes an uphole connection 26 and a downhole connection 24. The segment 14 is configured so that the uphole connection 26 is positioned at an uphole location relative to the downhole connection 24. The downhole connection 26 includes a male connection portion 28 having an exterior threaded section, and is referred to herein as a "pin end" 26. The uphole connection 26 includes a female connection portion 30 having an interior threaded section, and is referred to herein as a "box end" 26.

The pin 24 and the box 26 are configured so that the pin 24 can be disposed within the box 26 to form a fixed connection there between to connect to an adjacent segment 12 or other downhole component. In one embodiment, the exterior of the male connecting portion 28 and the interior of the female connecting portion 30 are tapered along the length of the segment 14 to facilitate connecting. Although the pin end 24 and the box end 26 are described as having threaded portions, the pin 24 and box 26 ends may be configured to be coupled using any suitable mechanism, such as bolts or screws or an interference fit.

In one embodiment, the system 10 is operably connected to a downhole or surface processing unit which may act to control various components of the system 10, such as drilling, logging and production components or subs. Other components include machinery to raise or lower segments 14 and operably couple segments 14, and couplers. The downhole or surface processing unit may also collect and process data generated by the system 10 during drilling, production or other operations.

As described herein, "drillstring" or "string" refers to any structure or carrier suitable for lowering a tool through a borehole or connecting a drill bit to the surface, and is not limited to the structure and configuration described herein. For example, the string 12 is configured as a drillstring, hydrocarbon production string or formation evaluation string. The term "carrier" as used herein means any device, device component, combination of devices, media and/or member that may be used to convey, house, support or otherwise facilitate the use of another device, device component, combination of devices, media and/or member. Exemplary non-limiting carriers include drill strings of the coiled tube type, of the jointed pipe type and any combination or portion thereof Other carrier examples include casing pipes, wirelines, wireline sondes, slickline sondes, drop shots, downhole subs, BHA's and drill strings.

Figure 2:
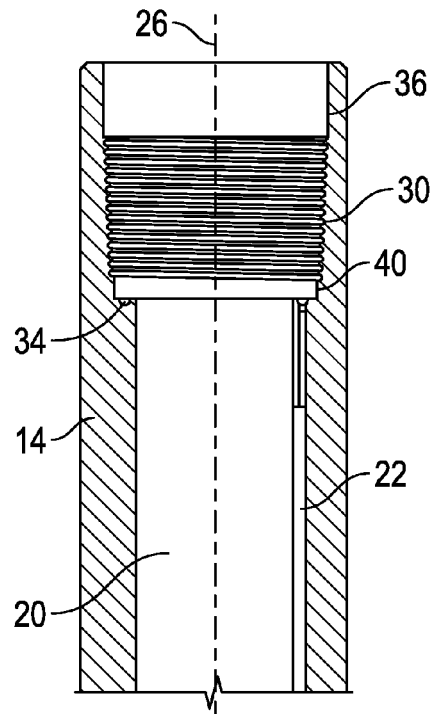
FIG. 2 depicts an exemplary embodiment of a box connector of the segment of FIG. 1.
Figure 3:
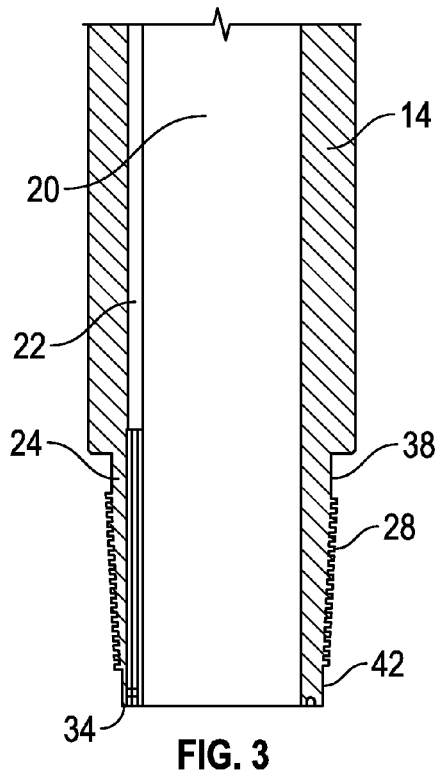
FIG. 3 depicts an exemplary embodiment of a pin connector of the segment of FIG. 1.

Referring to FIGS. 2 and 3, the segment 14 includes at least one coupler 34 disposed therein and located at the pin end 24 and/or the box end 26. The coupler 34 is configured to provide communication of at least one of data and power between adjacent segments 14 when the pin end 24 and the box end 26 are engaged. The coupler 34 may be of any suitable type, such as an inductive coil, capacitive connecting, direct electrical contacts and an optical connection ring. Further, the coupler 34 may be a resonant coupler.

It shall be understood that the coupler 34 could also be included in a repeater element disposed between adjacent segments 14 (e.g., within the box end). In such a case, the data/power is transmitted from the coupler 34 in one segment 14, into the repeater. The signal may then be passed "as is," amplified, and/or modified in the repeater and provided to the adjacent segment 14. Regardless of the configuration, it shall be understood that each coupler 34 can be connected to one or more transmission lines 22.

Figure 4:
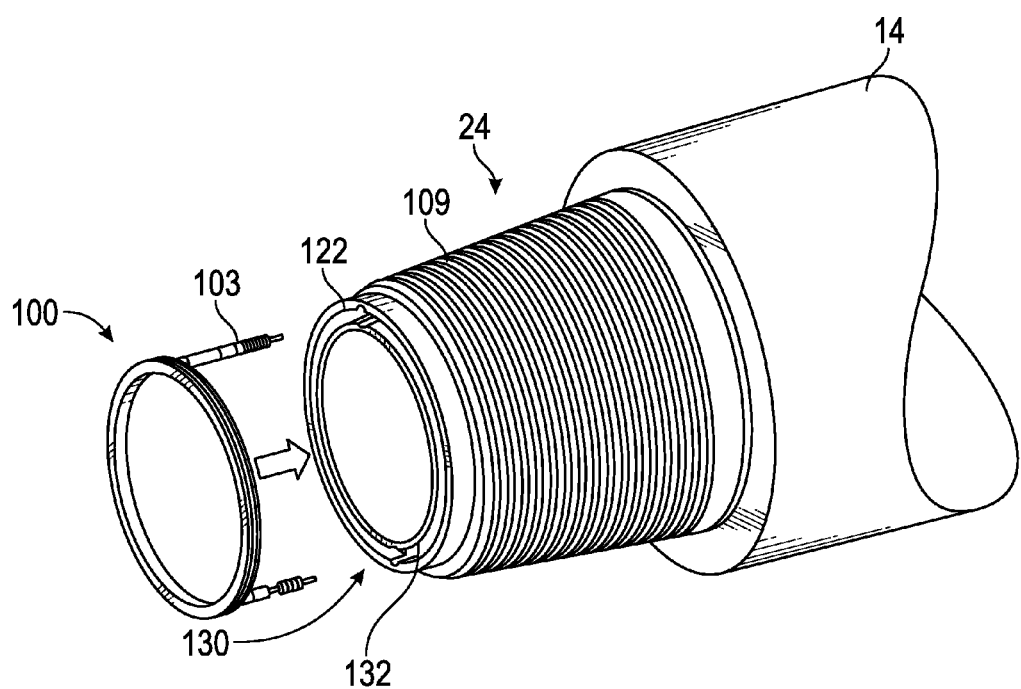
FIG. 4 illustrates a pin-end of a wired pipe segment and a coupler that is inserted into the pin-end.

FIG. 4 shows an exploded view of a pin end 24 of a segment 14 as adapted to receive an example embodiment of a coupler 100. Embodiments herein are directed to a coupler 100 that is robust enough to withstand downhole conditions (static/dynamic/shock loads, environment) and rough handling on surface when drilling components being made up, racked back or transported. The coupler 100 may provide protection and sealing of the electronic components against high drilling mud pressure. Methods of forming couplers such as couplers 34/100 are described in greater detail below and it shall be understood that while those two couplers have been identified, the teachings herein may be applied to any coupler.

The pin end 24 includes threads 109 that can be used, as described above, to couple the pin 24 to a box of another segment 14. A distal end 130 of the pin end 24 includes a recess 122 formed therein. As shown, the recess 122 is formed as a groove. Of course the exact configuration of the recess 122 is not limited to only such a configuration. The coupler 100 includes coupler connectors 103 configured to electrically connect to one or more transmission lines (e.g., transmission lines) disposed in the segment 14. The recess 122 is shaped such that it receives the coupler 100 and can include holes 132 to receive the coupler connectors 103 such that the coupler 100 is at least partially, or completely, disposed within the recess 122. It shall be understood that a similar recess can also be formed in the similar manner in the box end (not shown) of the segment 14.

Figure 5:
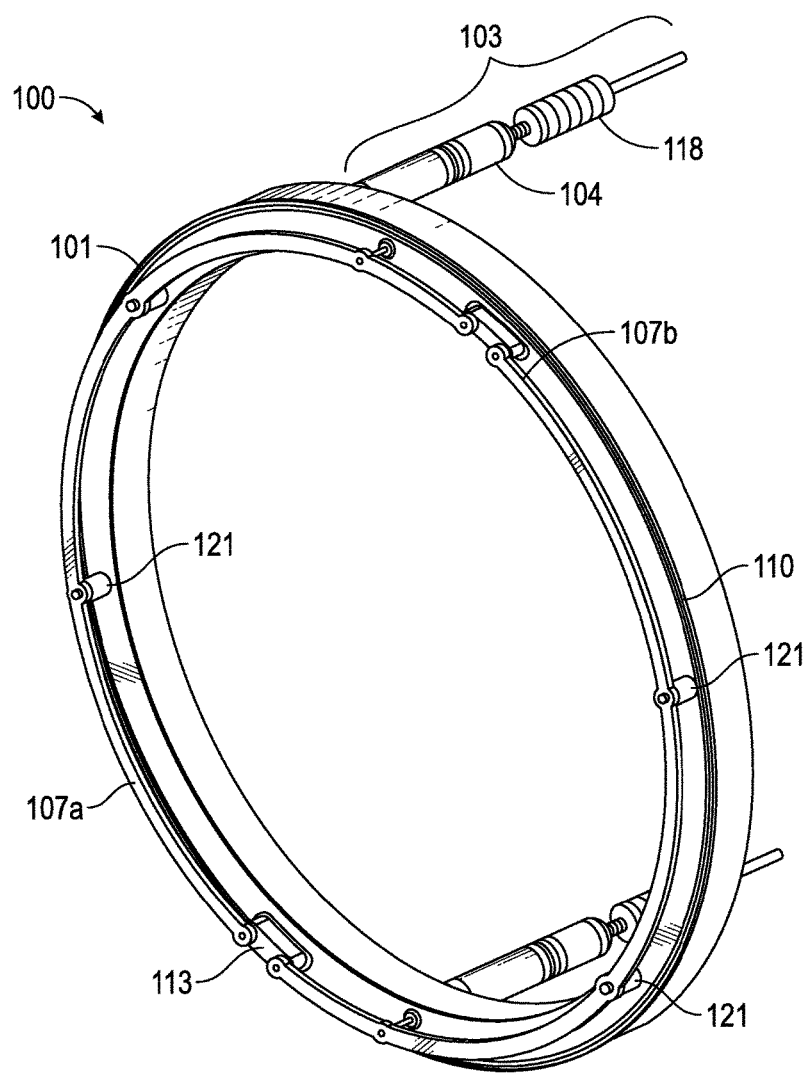
FIG. 5 is a perspective view of a coupler according to one embodiment.

FIG. 5 illustrates the coupler 100 of FIG. 5 in greater detail. The coupler 100 includes at least one antenna and two separate antennas 107 (shown as 107a and 107b) are illustrated. Of course, the particular number of antennas 107 is not limited to only two and more could be included. In general, each antenna 107 transmits a signal that is received on a coupler connector 103 to which it is physically and electrically connected. In the illustrated embodiment, the first antenna 107a is physically and electrically (e.g., galvanically) connected to a first coupler connector 103a and a second antenna 107b is physically and electrically connected to a second coupler connector 103b. The first and second antennas 107a, 107b may be electrically coupled to one another by electronic components that are coupled to an electric ground formed, for example, by the segment 14. In one embodiment, the first and second antennas 107a, 107b are semi-circular in shape and extend slightly less than 180 degrees. The first and second antennas 107a, 107b are connected at both their respective ends to the other antenna through electronic components and the segment 14 in one embodiment. That is, in one embodiment, each end of each antenna 107 is coupled to separate electronics. Of course, it shall be understood that the exact location on the antenna 107 that is connected to an electronic component could be varied depending on the context.

The coupler 100 also includes a carrier or ground plane 110. In one embodiment, the electronics mentioned above are disposed within the carrier 110. The carrier 110 can be formed of a metallic material such as conductive steel. The coupler 100 also includes one or more spacers 121 disposed between the antennas 107 and the carrier 110 that fix the antennas 107 in a defined position relative to the carrier 110 during operation as well as during manufacturing process. In one embodiment, the spacers 121 are made at least partially of insulating materials such as, for example, ceramic or plastics like Teflon or polyether ether ketone (PEEK). In one embodiment, the spacers 121 are optional and may be omitted.

The coupler 100 further includes two or more housings double connectors 113 creating a pressure tight cavity inside the embodiment to provide space for any kind of electronics to be placed and protect from drilling environment. The electronic housings could be carried by the carrier 110 or placed e.g. in the coupler connectors 103a or 103b or at any other location inside the coupler 100. In one embodiment the housing 113 are integrally formed with the carrier 110. In another embodiment the housings 113 are removable from the carrier 110. In such an embodiment, the housings 113 may be welded to the carrier 110 to ensure a pressure tight and electrically reliable connection to the carrier 110. Such a connection is important considering that the coupler 100 is to be used in a harsh downhole environment as well as during manufacturing process of the coupler 100.

In one embodiment, the coupler 100 shown in FIG. 5 may be constructed out of separate mechanical parts building the antenna structure. First and second antenna 107a, 107b as well as grounding plane 110 and spacers are separately manufactured and joined by means of welding in order to connect those parts electrically. The overall structure could be encapsulated by plastic material in a next manufacturing step to isolate and protect the antenna circuit from environmental interferences.

Figure 6A:
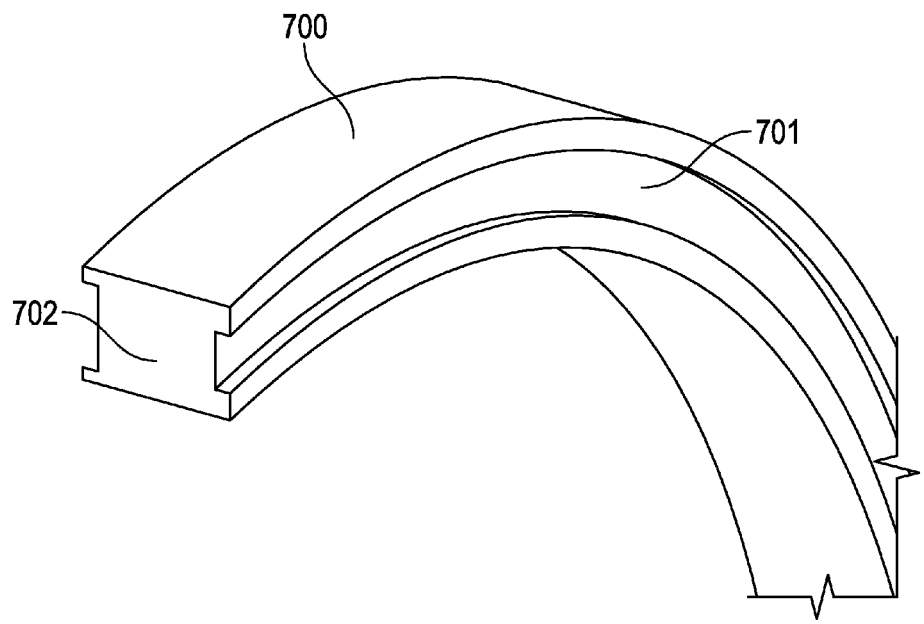
FIGS. 6A-6D show processing steps of forming a coupler.
Figure 6B:
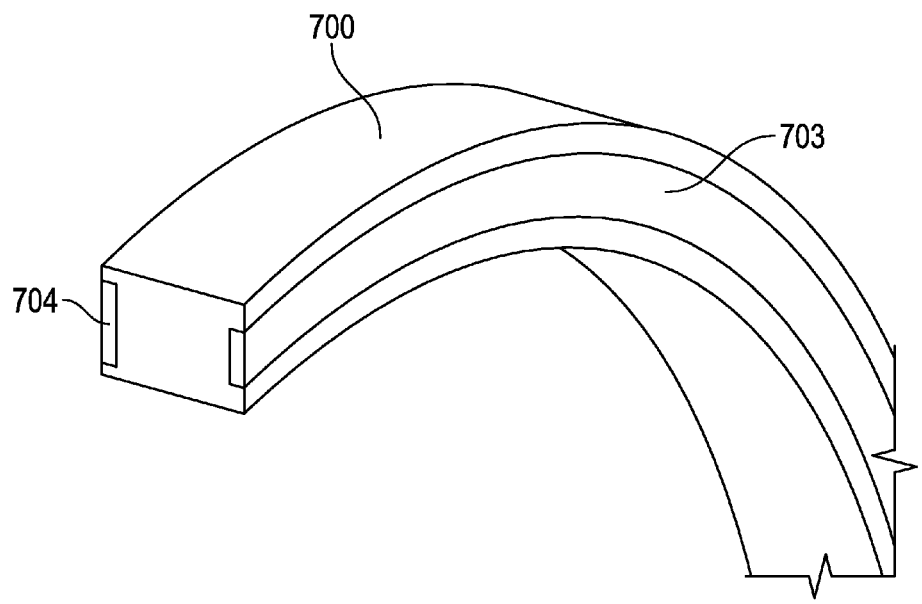
Figure 6C:
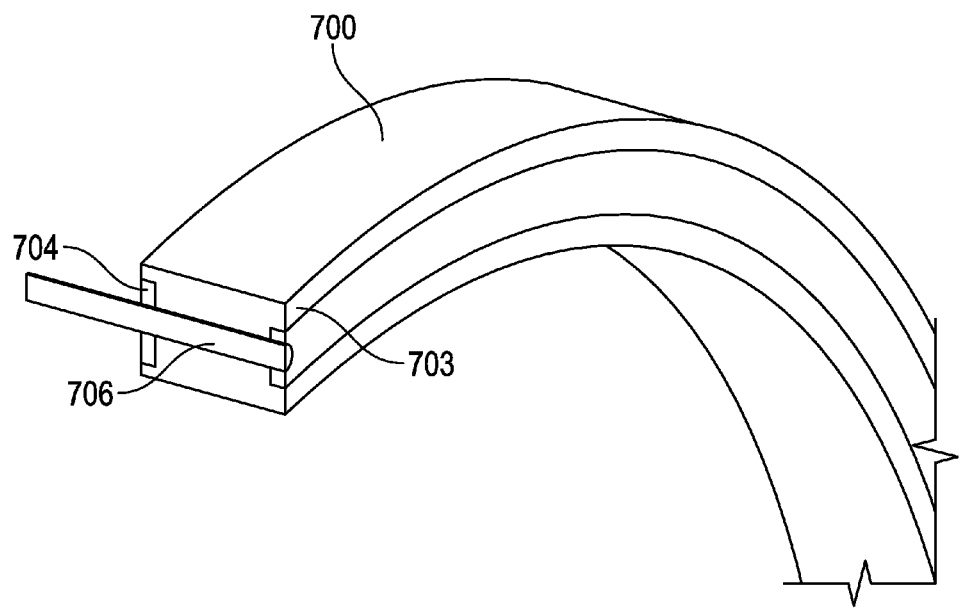
Figure 6D:
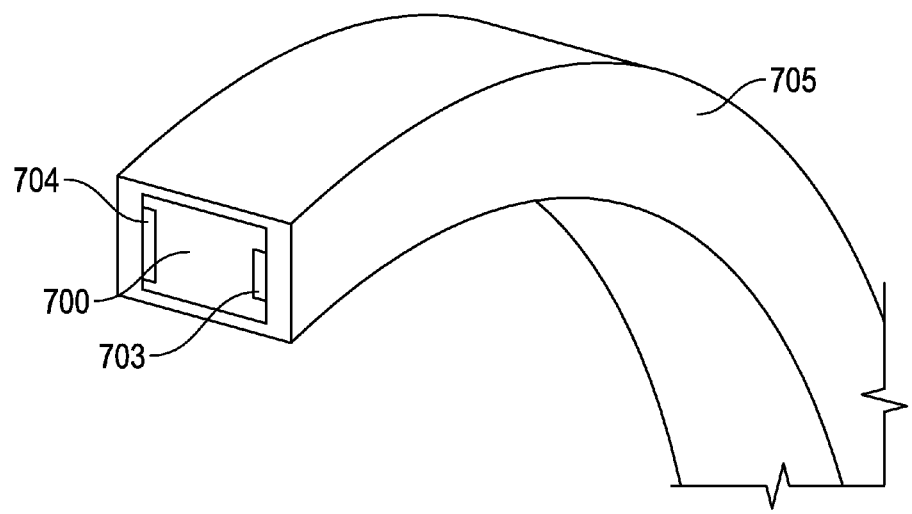

Referring now to cross-sections views FIGS. 6A-6D a process of forming coupler 100 is described. Using a multi-component injection molding technology it is possible to combine different materials suitable for injection molding in one process. That means the carrier 700 will be molded in a first process step using plastic material such as PEEK for example. The mold could be shaped such that it provides recesses like 701 and 702 in the carrier ring 700. In a next step the recesses 701 and 702 are used to inject metal material into those recesses creating the antenna structure. The melting point of such material should not exceed the melting point of plastic. That implements that only solder-like metals could be used within this process. The solder-like metal creates the antenna 703 as well as the grounding plane 704. Due to the properties of the solder-like material it is also possible to create electrical connections to other integrated electrical components such as connectors or the like. FIG. 6C shows a possible connection of the metal structure with an electrical connector 706 that is realized during the multi-component injection molding process. The molding machine is equipped with the connector prior to the overall process and gets covered by the plastic material 700 first after being connected to metal structures 703 and 704 by injecting the metal into the recess. The injected metal structure 703, 704 plus plastic carrier 700 could be covered at the end of the process with plastic material 705 in order to encapsulate and protect the inner structure. Compared to the embodiment shown in FIG. 5 the complex assembling process of joining all functional parts gets significantly reduced because the multi-component technology takes place in one machine without any manually influence.

One skilled in the art will recognize that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of forming a wired pipe coupler including:
   molding with plastic in a molding machine a plastic carrier ring that includes one or more recesses;
   injecting metal into the one or more recesses while the plastic carrier ring is in the molding machine to form a metal ground plane, the melting point of the metal not exceeding the melting point of the plastic;
   connecting an electrical connector to the ground plane;
   forming a metal antenna in the molding machine while the plastic carrier ring is in the molding machine and that are in electrical contact with the electrical connector; and
   covering the plastic carrier ring, the metal ground plane and the antenna with a plastic covering;
   wherein molding, injecting, forming and covering are all done in a single molding machine.

2. The method of claim 1, further comprising:
   disposing one or more spacers between the metal ground plane and the one or more antennas that hold the metal antenna a fixed distance from the metal ground plane.

3. The method of claim 2, wherein the one or more spacers are formed at least partially of a ceramic.

4. The method of claim 1, further comprising directly electrically connecting a coupler connector to the metal antenna.

5. The method of claim 1, wherein the plastic material is polyether ether ketone (PEEK).

6. The method of claim 1, wherein forming the antenna includes forming a first antenna and a second antenna.

7. The method of claim 1, further comprising:
   connecting the first antenna to a first coupler connector; and
   connecting the second antenna to a second coupler connector.

* * * * *